US012440947B2

(12) United States Patent
Heggemann et al.

(10) Patent No.: US 12,440,947 B2
(45) Date of Patent: Oct. 14, 2025

(54) MANUALLY OPERABLE PLIERS TOOL

(71) Applicant: Weidmüller Interface GmbH & Co. KG, Detmold (DE)

(72) Inventors: Christian Heggemann, Detmold (DE); Siegfried Storm, Schlangen (DE)

(73) Assignee: Weidmüller Interface GmbH & Co. KG (DE)

(*) Notice: Subject to any disclaimer, the term of this patent is extended or adjusted under 35 U.S.C. 154(b) by 333 days.

(21) Appl. No.: 18/066,563

(22) Filed: Dec. 15, 2022

(65) Prior Publication Data

US 2023/0191562 A1 Jun. 22, 2023

(30) Foreign Application Priority Data

Dec. 22, 2021 (DE) ..................... 10 2021 134 355.0

(51) Int. Cl.
*B25B 7/02* (2006.01)
*B25B 7/22* (2006.01)

(52) U.S. Cl.
CPC . *B25B 7/22* (2013.01); *B25B 7/02* (2013.01)

(58) Field of Classification Search
CPC .... B25B 1/00; B25B 1/04; B25B 7/02; B25B 7/12; B25B 7/14; B25B 7/22; B25B 7/123; B25B 27/146; B25B 7/04; B25B 7/06; B25B 7/10; B25B 7/18; B25B 13/10; B25B 13/20; B25B 13/28; B25B 13/34; B25B 13/46; H01R 43/042; B23D 29/023; B26B 13/26; B25G 1/005; B25G 1/063; B25G 1/066; B25G 3/38
See application file for complete search history.

(56) References Cited

U.S. PATENT DOCUMENTS

| | | | |
|---|---|---|---|
| 2,562,128 A * | 7/1951 | Sawdy | B25B 27/20 29/224 |
| 5,184,404 A | 2/1993 | Chen | |
| 5,280,716 A * | 1/1994 | Ryan | B25B 7/123 81/383 |
| 6,116,124 A * | 9/2000 | Ping | B25B 7/12 81/319 |
| 6,508,149 B1 | 1/2003 | Heggemann et al. | |

(Continued)

FOREIGN PATENT DOCUMENTS

| | | |
|---|---|---|
| DE | 29623004 U1 | 11/1997 |
| DE | 19807737 C2 | 6/2000 |
| DE | 202013103070 U1 | 12/2013 |

(Continued)

*Primary Examiner* — Robert J Scruggs
(74) *Attorney, Agent, or Firm* — LAUBSCHER & FRETWELL, P.C.

(57) ABSTRACT

A manually operable pliers tool has first and second pressing jaws pivotally connected about a first pivot axis. A first handle extends from the first pressing jaw and a second handle is linked to the second pressing jaw. The second pressing jaw has a u-shaped node element with a base mounted on the first pressing jaw via the first pivot axis and a first limb mounted on the second handle via a second pivot axis. A stop, which is adjustable between a passive position and an active position, is arranged on the first pressing jaw, wherein opening movement of the second handle can be limited by a second limb of the node element coming to a stop on the stop by setting the stop into the active position.

7 Claims, 6 Drawing Sheets

(56) References Cited

U.S. PATENT DOCUMENTS

2019/0319417 A1* 10/2019 Glockseisen ........ H01R 43/042

FOREIGN PATENT DOCUMENTS

EP 1080845 A2 * 3/2001 ........... B25B 27/146
EP 1080845 B1 10/2003
EP 3179580 A1 6/2017
EP 3834989 A1 6/2021

* cited by examiner

MANUALLY OPERABLE PLIERS TOOL

This application claims priority of De 10 2021 134 355.0 filed Dec. 22, 2021. The entire content of this priority application is incorporated herein by reference.

BACKGROUND OF THE INVENTION

The present invention relates to a manually operable pliers tool.

BRIEF DESCRIPTION OF THE PRIOR ART

A generic manually operable pliers tool is known from EP 1080845 B1, for example and is used to crimp wire end ferrules onto all ends of conductor cables, for example.

Depending on the intended use, when crimping ferrules of different cross-sections, for example, the pliers mouth and concomitantly the manual lever of the pliers tool do not have to be opened, or spread apart, to the maximum extent during every operating process.

The present invention is to provide a pliers tool to the extent that limiting of the opening movement of the second manual lever is possible in a simple manner.

SUMMARY OF THE INVENTION

The manually operable pliers tool according to the invention has a first pressing jaw with a first handle extending therefrom, and a second pressing jaw pivotably mounted on the first pressing jaw about a first pivot axis and a second handle which can move in a spreadable manner relative to the first handle and which is linked to the second pressing jaw.

The second pressing jaw has a u-shaped node element with a base and two limbs extending from the base in the direction of the handles, wherein the base of the node element is mounted on the first pressing jaw via the first pivot axis and a first of the limbs is mounted on the second handle via a second pivot axis.

When a pliers mouth formed by the sections of the pressing jaws which are remote from the handles is opened, the second limb of the node element is pivoted in the direction of an upper outer rim of the first pressing jaw which is remote from the second pressing jaw.

A stop, which is adjustable between a passive position and at least one active position, is disposed on the first pressing jaw with an opening movement of the second handle being limited by the second limbs of the node elements coming to a stop on the stop by setting the stop into the at least one active position.

Using a manually operable pliers tool configured in such a way, it is possible to limit, simply by setting a stop disposed on the first pressing jaw, the spreading apart of the second handle from the first handle. Accordingly, where partial spreading of the pliers grips relative to one another, and accordingly a partial opening of the pliers mouth, is sufficient, the spreading angle of the second manual lever can be limited by the user to a necessary extent by adjusting the stop.

According to a first embodiment, the stop can pivot about a third pivot axis between the passive position and the at least one active position. This enables extremely simple setting of the stop by pivoting it.

According to another embodiment, the stop has an operating member for manually adjusting the stop between the passive position and the at least one active position.

This operating member of the stop protrudes outwards over the outer rim of the first pressing jaw. This makes it possible to set the stop via one of the user's fingers.

According to a further embodiment, the stop has at least one first stopping edge, which, when the stop is positioned in the active position, prevents an opening movement of the second handle into a maximum opening position by limiting the pivot path of a node element.

Such a stopping edge, which comes to a stop on a corresponding outer rim of the second limb or the node element, ensures that a continuation of the opening movement of the second manual lever is reliably prevented.

In a preferred embodiment, the stop has several such stopping edges, which, via a stop positioned in the active position, enables an opening movement of the second handle only to respective limited opening positions which are smaller than the maximum opening position of the second handle.

In yet a further embodiment, the stop also has a further stopping edge which, when the stop is positioned in the passive position, abuts the node element when the second handle is in the maximum opening position.

BRIEF DESCRIPTION OF THE FIGURES

Other objects and advantages of the invention will be explained in greater detail below with reference to the accompanying drawings, in which.

DETAILED DESCRIPTION in the following description of the figures, terms such as top, bottom, left, right, front, rear, etc. relate exclusively to the depiction and position of the pliers tool, the pressing jaw, the manual lever, node element, stop and the like chosen by way of example in the respective figures. These terms should not be understood to be restrictive, i.e. these references may change through different working positions or the symmetrically identical design or the like.

Figure 1:
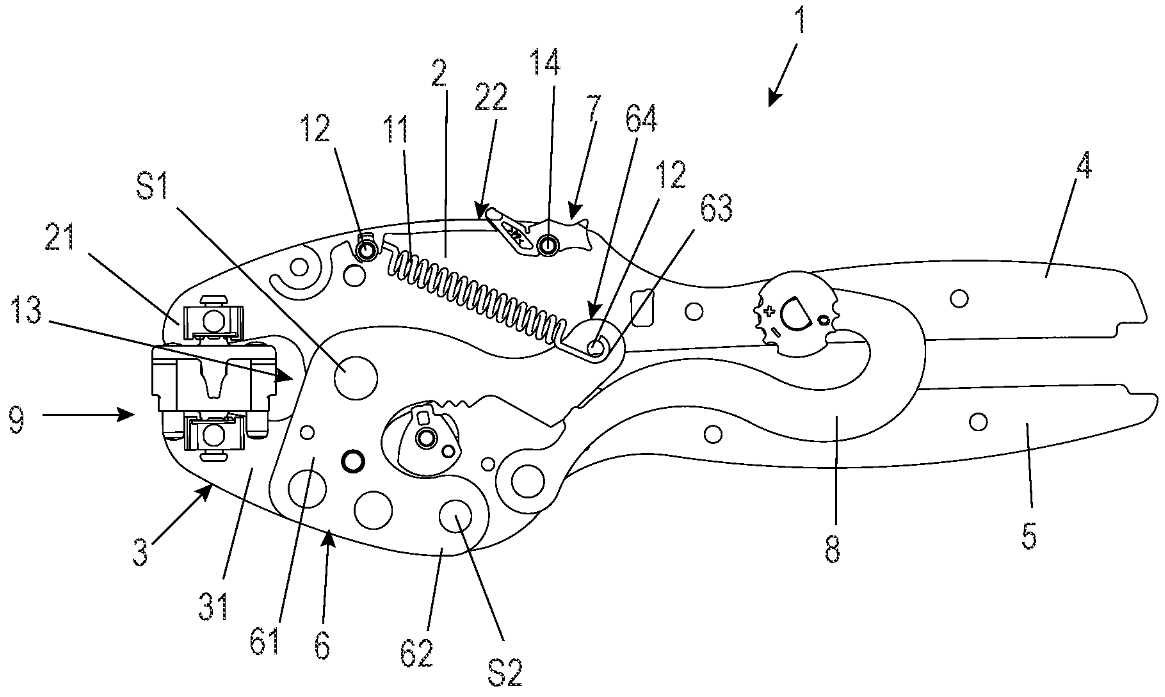
FIG. 1 is a schematic side view of the pliers tool according to the invention in its closed position with a stop in the passive position.

In FIG. 1, a preferred embodiment of a manually operable pliers tool according to the invention is labelled overall with the reference number 1.

The pliers tool 1 includes a first pressing jaw 2 with a first handle 4 extending therefrom. The handle 4 and the first pressing jaw 2 are formed integrally.

Furthermore, the pliers tool 1 includes a second pressing jaw 3 mounted on the first pressing jaw 2, pivotably about a first pivot axis S1, and a second handle 5 which can move in a spreadable manner relative to the first handle 4 and which is linked to the second pressing jaw 3.

The second pressing jaw 3 has a u-shaped node element 6, alongside a front section 31 which is remote from the second handle 5 and which forms a pliers mouth 13 together with a front section 21 of the first pressing jaw 2.

The node element 6 has a base 61 and two limbs 62, 63 extending from the base 61 in the direction of the handles 4, 5.

The base 61 of the node element 6 is mounted on the first pressing jaw 2 via the first pivot axis S1. A first of the limbs 62 (lower limb in FIG. 1) is mounted on the second handle 5 via a second pivot axis S2.

Through this design, when the pliers mouth 13 is being opened, the second limb 62 of the node element 6 can be pivoted in the direction of an upper outer rim 22 of the first pressing jaw 2, the outer rim being remote from the second pressing jaw 3.

Figure 2:
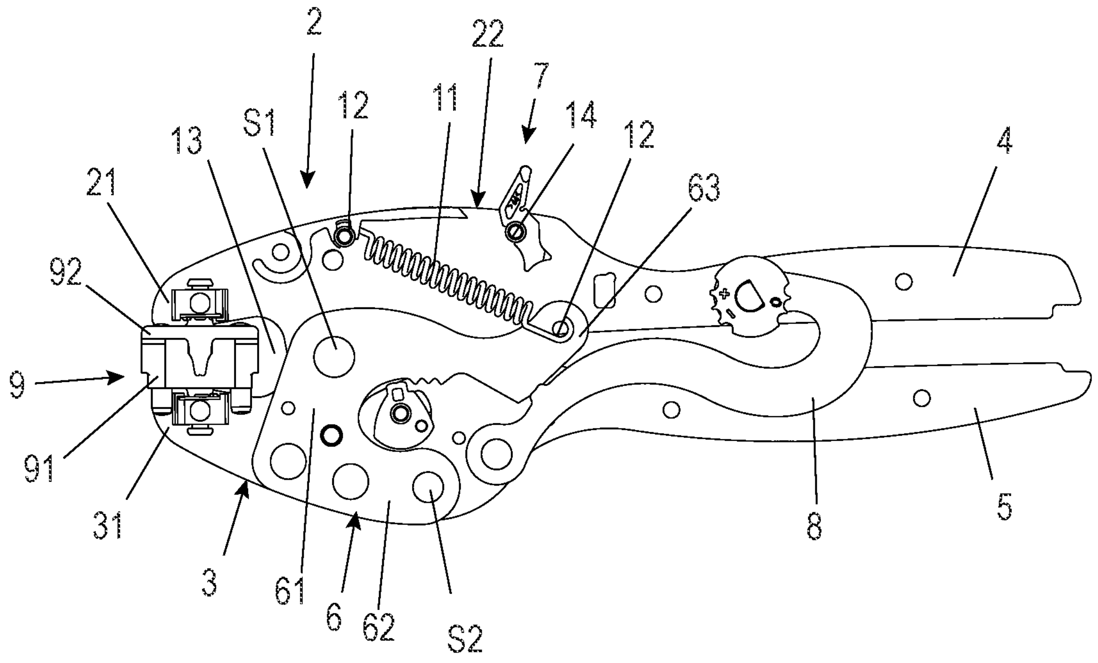
FIG. 2 is a side view of the pliers tool, corresponding to FIG. 1, with the stop pivoted into an active position.

As shown in FIG. 1 that a stop 7 is disposed on the first pressing jaw 2. In the depiction shown in FIG. 1, this stop 7 is positioned in a passive position. In FIG. 2, the stop 7 is pivoted into an active position.

A third pivot axis 14 which is disposed on the first pressing jaw 2 and which is received in a hinge receptacle 74 of the stop 7 serves to pivot the stop 7.

Figure 6:
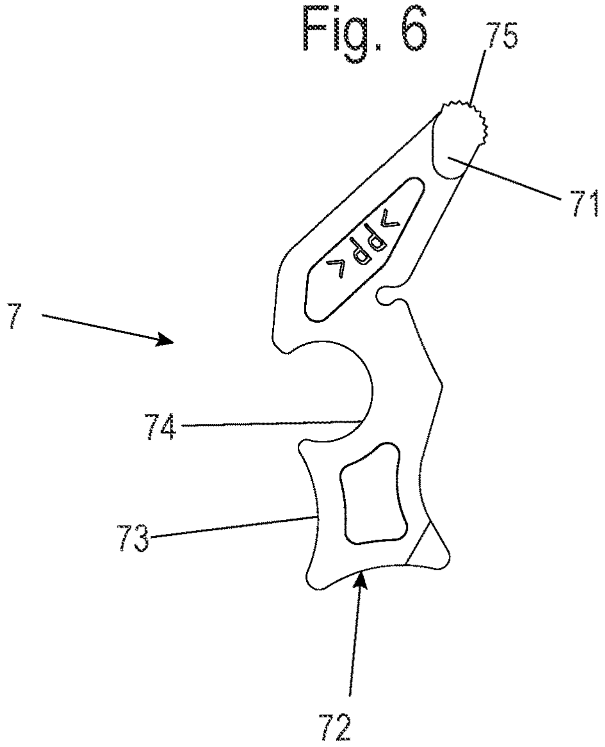
FIG. 6 is a side view of a first embodiment of a stop.

A detailed illustration of such a stop 7 is depicted in FIG. 6.

The stop 7 shown in FIG. 6 has an operating member 71 for manually adjusting the stop 7 between the passive position and an active position.

As further shown in FIG. 6, knurling 75 or the like is molded on an outer rim of the operating member 71 for simple operation of the pliers tool 1, for example with the fingertip of one finger.

Figure 3:
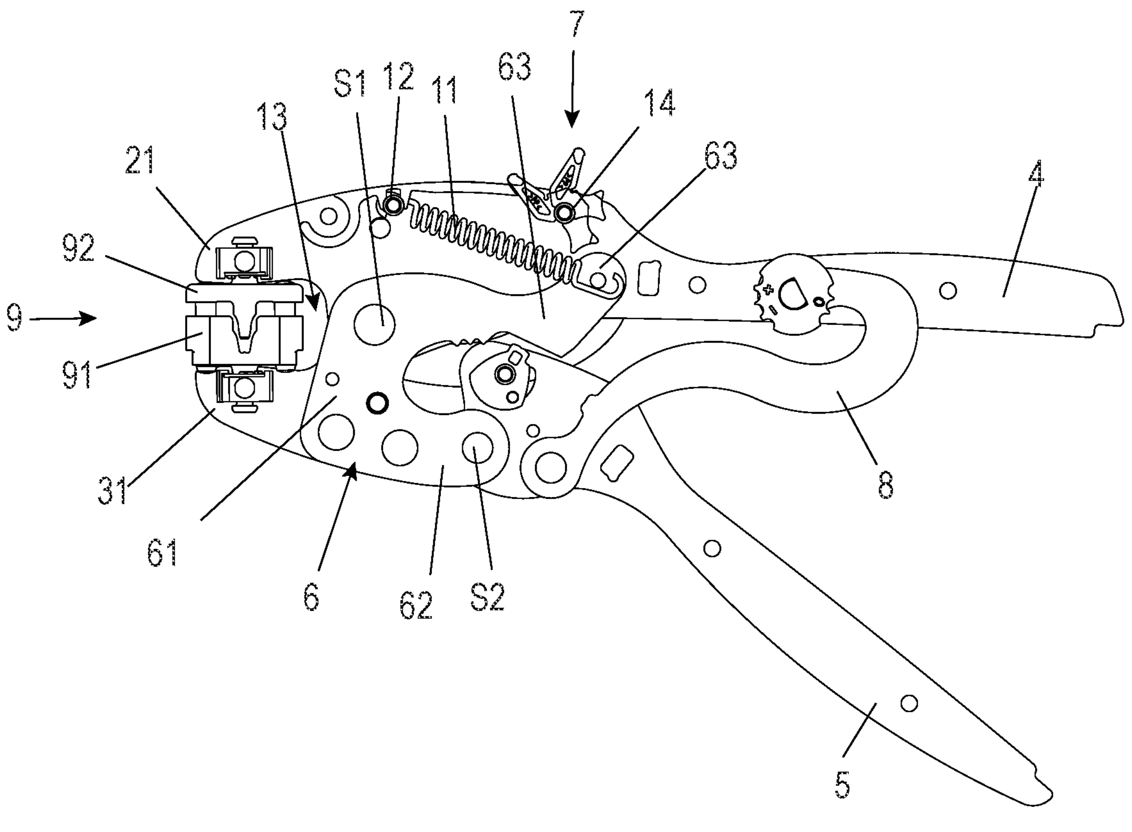
FIG. 3 is a side view, corresponding to FIGS. 1 and 2, of the pliers tool with the pliers mouth in a slightly opened position, with the stop both in the passive and in an active position.
Figure 5:
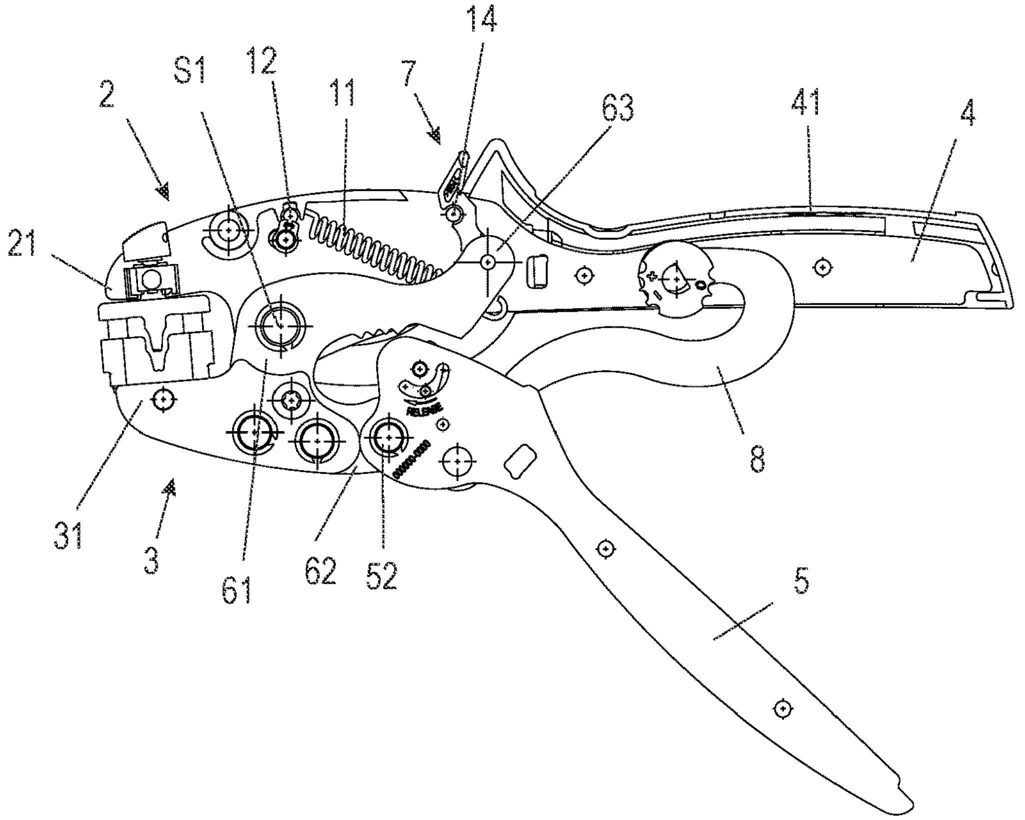
FIG. 5 is a side view of the pliers tool, corresponding to FIG. 2, with a partially opened pliers mouth which is limited by the stop.

The stop 7 further has a first stopping edge 72 which, when the stop 7 is positioned in the active position, prevents an opening movement of the second handle 5 into a maximum opening position by limiting the pivot path of the node element 6, as is depicted by way of example in FIGS. 3 and 5.

As is further shown in FIGS. 1 to 5 and 7, the operating member 71 of the stop 7 always protrudes over the outer rim 22 of the first pressing jaw 2, which considerably simplifies the operability of the stop 7 via the operating member 71.

The opening movement of the second handle 5 can be limited by the second limb 63 of the node element 6 coming to a stop on the stop 7 by setting the stop 7 into the at least one active position.

Figure 4:
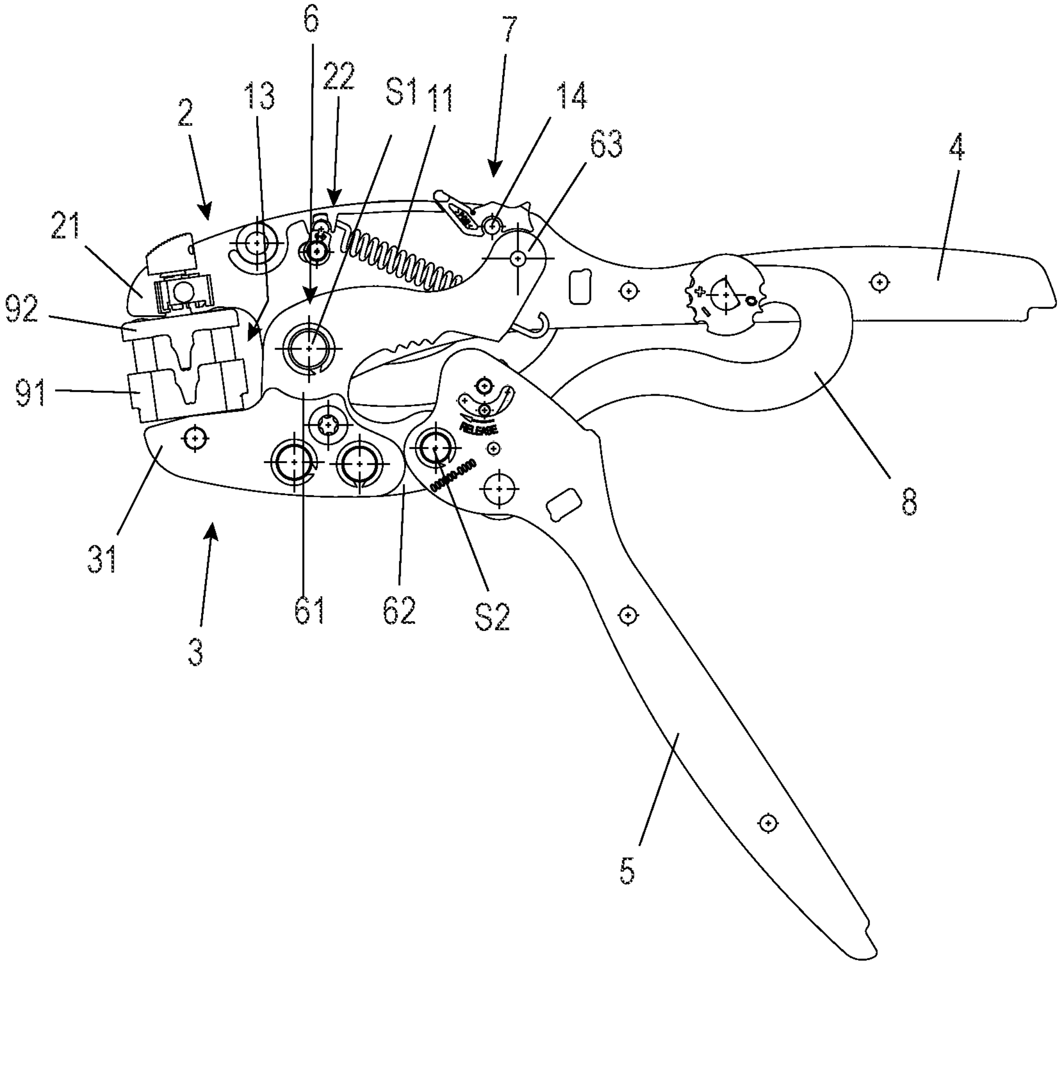
FIG. 4 is a side view of the pliers tool, corresponding to FIG. 1, in the maximum opened state.

As shown in FIG. 6, the stop 7 also has, in addition to the first stopping edge 72, a second stopping edge 73 which enables the node element 6 to come to a stop on an adjoining edge 64 in the passive position of the stop 7, as shown for example in FIG. 4.

When the pliers tool 1 is being used as a crimping tool, this position makes it possible, for example, to introduce all ferrules having a relatively large cross-section, in particular a cross-section of 6 $mm^2$ into a crimping unit 9 which is placed in a pliers mouth 13 and which has a die 92 disposed on the first pressing jaw 2 and a die receptacle 91 disposed on the second pressing jaw 3.

If the stop 7 is pivoted into the active position shown in FIG. 5, a maximum opening of the pliers mouth 13 and the maximum spreading apart of the handles 4, 5 is prevented, as described above.

However, this handle position and the spreading apart of the pliers mouth 13 which it entails is sufficient in order to insert wire end ferrules, for example, which have cross-section surfaces of, for example, 2.5 $mm^2$ into the crimping unit 9 and to crimp a wire end of a cable to the wire end ferrule.

Figure 7:
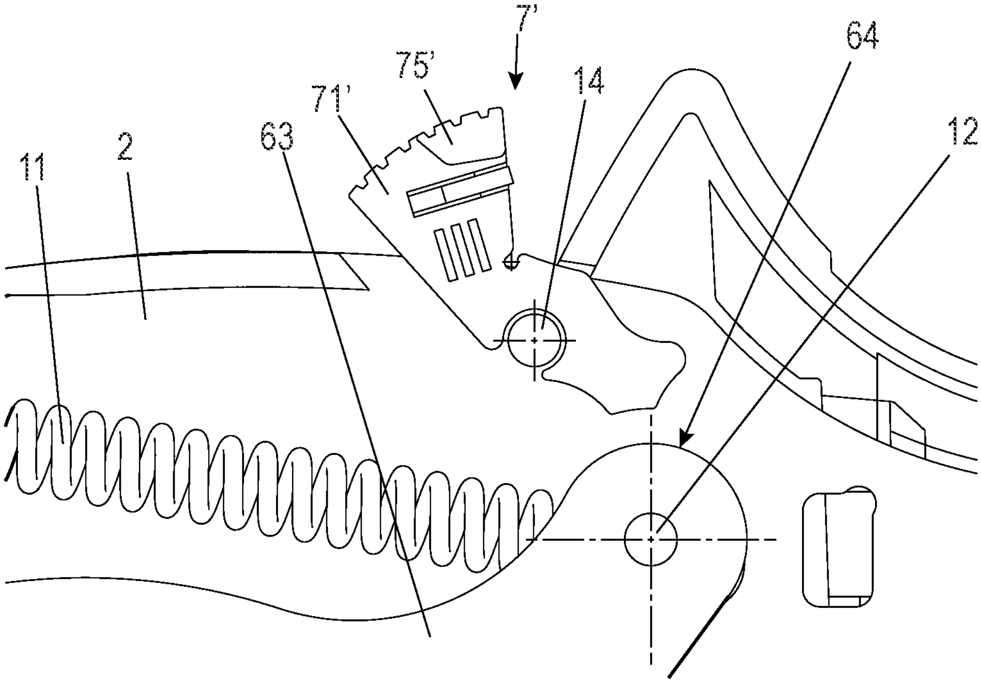
FIG. 7 is an enlarged view of a portion of the pliers tool, on which the stop is disposed on the first pressing jaw, with a second embodiment of a stop disposed thereon in a first active position.
Figure 8:
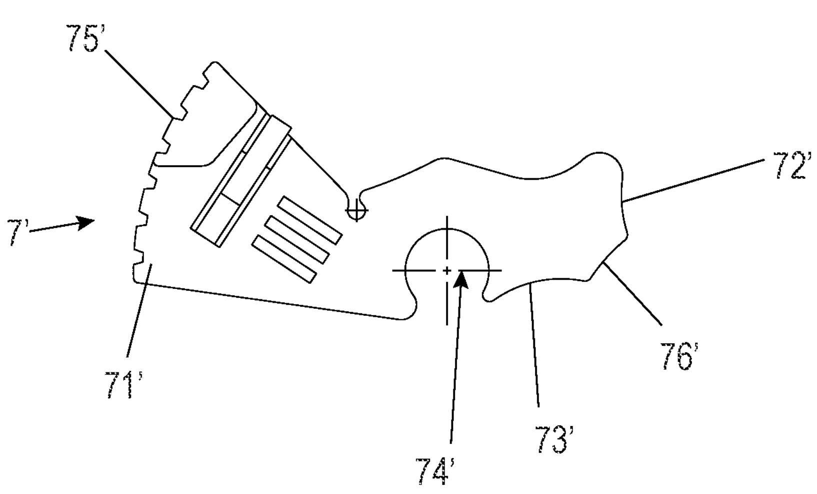
FIG. 8 is a detailed side view of the second embodiment of the stop with several stopping edges for different active positions.

An alternative embodiment of a stop 7' as shown in FIGS. 7 and 8, the design of which substantially corresponds to that of the stop 7 according to FIG. 6, includes an operating member 71', a hinge receptacle 74', a first stopping edge 72' for stopping in a first active position, and a second stopping edge 73' for stopping in the passive position.

In this alternate embodiment, the end region of the stop 7' which faces away from the operating member 71' is formed with a third stopping edge 76 which, as shown in FIG. 7, makes it possible to limit the opening position of the second lever 5 to a further extent.

The mounting of the stop 7, 7' on the third pivot axis 14 is preferably configured as a locking bearing, so that the respective pivoting positions, which correspond to the stopping of the adjoining edge 64 of the node element 6 with respective stopping edges 72, 72', 73, 73', 76', can be locked in.

As can furthermore be gathered from FIGS. 1 to 5, the second manual lever 5 is additionally coupled to the first manual lever 4 via a connecting link 8.

What is claimed is:

1. A manually operable pliers tool, comprising a first pressing jaw having a first handle extending therefrom;

a second pressing jaw pivotably mounted on said first pressing jaw about a first pivot axis;

a second handle which can move in a spreadable manner relative to said first handle and which is linked to said second pressing jaw; said second pressing jaw having a u-shaped node element having a base and two limbs extending from said base in the direction of said first and second handles, said base being mounted on said first pressing jaw via the first pivot axis and a first of said limbs being mounted on said second handle via a second pivot axis, sections of said pressing jaws remote from said handles forming a pliers mouth which when opened, pivots a second limb of said node element in the direction of an upper outer rim of said first pressing jaw, said outer rim being remote from said second pressing jaw; and a stop adjustable between a passive position and at least one active position is arranged on the first pressing jaw, opening movement of said second handle being limited by said second limb of said node element coming to a stop on said stop by setting said stop into the at least one active position, said stop further limiting maximum opening movement of said second handle when said stop is placed in the passive position.

2. The pliers tool as defined in claim 1, wherein said stop is pivotable about a third pivot axis between the passive position and the at least one active position.

3. The pliers tool as defined in claim 2, wherein said stop includes an operating member for manually adjusting said stop between the passive position and the at least one active position.

4. The pliers tool as defined in claim 3, wherein said operating member of said stop protrudes over said outer rim of said first pressing jaw.

5. The pliers tool as defined in claim 1, wherein said stop has at least one first stopping edge, which, when said stop is positioned into the active position, prevents an opening movement of said second handle into a maximum opening position by limiting a pivot path of said node element.

6. The pliers tool as defined in claim 5, wherein said stop has several a plurality of edges, which, when said stop is positioned in the active position, enable an opening movement of said second handle only to respective limited opening positions which are smaller than the maximum opening position of said second handle.

7. The pliers tool as defined in claim 6, wherein said stop has a further stopping edge, which, when said stop is positioned in the passive position, abuts said node element when said second handle is in the maximum opening position.

* * * * *